United States Patent [19]
Keating et al.

[11] Patent Number: 5,297,423
[45] Date of Patent: Mar. 29, 1994

[54] STORAGE TANK AND LINE LEAKAGE DETECTION AND INVENTORY RECONCILIATION METHOD

[75] Inventors: Jerome P. Keating; William W. Dunn; William D. Dunn, all of San Antonio, Tex.

[73] Assignee: Integrated Product Systems, Inc., San Antonio, Tex.

[21] Appl. No.: 920,616

[22] Filed: Jul. 27, 1992

[51] Int. Cl.$^5$ .............................................. G01M 3/32
[52] U.S. Cl. ....................................................... 73/49.2
[58] Field of Search ........................................ 73/49.2

[56] References Cited

U.S. PATENT DOCUMENTS

| | | | |
|---|---|---|---|
| 3,200,645 | 8/1965 | Levins | 73/313 |
| 3,224,270 | 12/1965 | Karol et al. | 73/209 |
| 3,935,741 | 2/1976 | Zinsmeyer et al. | 73/313 |
| 3,976,963 | 8/1976 | Kübler | 335/206 |
| 4,056,979 | 11/1977 | Bongort et al. | 73/313 |
| 4,102,191 | 7/1978 | Harris | 73/313 |
| 4,627,283 | 12/1986 | Nishida et al. | 73/313 |
| 4,730,491 | 3/1988 | Lew | 73/308 |
| 4,738,313 | 4/1988 | McKee | 166/372 |
| 4,796,472 | 1/1989 | Lew | 73/308 |
| 4,827,762 | 5/1989 | Hasselmann | 73/49.2 |
| 4,852,054 | 7/1989 | Mastandrea | 73/49.2 X |
| 4,945,756 | 8/1990 | Lewis et al. | 73/49.2 |
| 4,972,710 | 11/1990 | Uhlarik et al. | 73/49.2 X |
| 4,976,146 | 12/1990 | Senghaas et al. | 73/313 |
| 4,986,113 | 1/1991 | Harrison et al. | 73/49.2 |

FOREIGN PATENT DOCUMENTS 2306638 8/1974 Fed. Rep. of Germany .
2604894 9/1976 Fed. Rep. of Germany .
1520771 4/1968 France .

*Primary Examiner*—Hezron E. Williams
*Assistant Examiner*—Joseph W. Roskos
*Attorney, Agent, or Firm*—Gunn, Lee & Miller

[57] ABSTRACT

A method for inventory maintenance and leak detection in liquid storage tanks and dispensing lines, that combines tank level measurements, tank product temperature measurements, output flow measurements, liquid product characteristics data, initial product delivery volume data, and redundantly calculates changes in the quantity of liquid product within the tank and compares these calculations to determine abnormalities in the changes in the quantities of product within the tank. Changes in the quantity of product within the tank are verified as either the delivery of additional product into the tank or the dispensing of product from the tank as with a customer sale. Changes that cannot be verified as either delivery into or dispensing from the tank are appropriately characterized as possible leak conditions in the tank or lines. The system additionally incorporates an accuracy improving process of restrapping or recharacterizing the physical conditions within the tank and recalibrating the flow meters associated with dispensing product from the tank. The combination of redundant measurements of volume changes and continuous recalibration of system measurements, along with the incorporation of product temperature measurements and product liquid/vapor state determinations, allows the system to detect with greater accuracy anomalies in the quantity of product within the tank.

14 Claims, 6 Drawing Sheets

STORAGE TANK AND LINE LEAKAGE DETECTION AND INVENTORY RECONCILIATION METHOD

BACKGROUND OF THE INVENTION

1. Field of the Invention

The present invention is directed generally to methods for detecting and quantifying leakage from storage tanks. The present invention is more specifically directed to improved techniques for continuous and automatic calibration of systems designed to detect and quantify leakage from liquid storage tanks and their lines to the meters, particularly those used with petroleum based products.

2. Description of the Prior Art

There are two related problems that occur in the management of large quantities of liquid product within above ground or underground storage tanks. The first of these problems involves simple inventory control and tracking of the quantity, level, and condition of the product within the tank. The second is a related problem and involves the detection of any unintentional releases of the liquid product from the tank most commonly through the existence of a leak. Both of these problems involve the accurate, real time, determination of the quantity of the product within the tank and the change in this quantity over periods of time. Because of cost controls and environmental concerns, it has become increasingly important in recent years, to very accurately determine and control industrial and other liquid products contained within storage tanks.

It is well known in the field to use both level monitors and flow meters to determine the quantity of a liquid product within a tank and/or to determine the amount of product that is dispensed from the tank by a user. The use of tank level meters, even accurate ones, typically involves a number of assumptions about the characteristics of the liquid product and the environmental characteristics such as temperature and pressure. The use of a level meter in conjunction with what is referred to as a tank "strap chart" is intended to provide the user with an indication of the quantity of the liquid remaining in the tank and, therefore, to some extent the quantity of liquid that might have been dispensed from the tank. A tank strap chart is a manufacturer's calculation or determination of the amount of liquid that would exist in the tank if a level meter in a particular position in the tank registered a specific level. Because the tanks are typically cylindrical in structure, a tank strap chart might either be determined based upon experimentation or based upon a mathematical model of the approximate dimensions of the tank. In any case, regardless of the actual shape of the tank, the combination of a level meter and a tank strap chart could, for example, allow the user to determine how much product was dispensed from the tank when the level dropped from 4.8 feet to 4.5 feet according to the level meter. Of course, that dispensed quantity would be different from the amount reflected by a drop from say 1.5 feet to 1.2 feet, even though the vertical level change is the same.

The problems associated with this relatively straight forward method of determining the quantity of liquid product in the tank and the amount that might have been dispensed, involve the impropriety of making assumptions about the effects of temperature and pressure and variations in the specific gravity of the product that might be placed within the tank. Temperature, pressure, and specific gravity all affect the volume per mass value for a particular product and, therefore, as these factors change the actual quantity of liquid product in the tank might be inaccurately measured.

As a rough example, a given quantity of petroleum product within a storage tank will register at one level when the temperature is at a cooler value and register at a slightly higher level when the temperature is warmer. In addition to temperature affecting the volume of the liquid product, the enclosed tank is actually an equilibrium environment in which the product exists in both a liquid state and a vapor state in the "ullage" or space above the liquid product. This equilibrium constantly transfers products from liquid state to vapor state and affects the actual quantity of the product measured by a level meter within the tank, especially when the product is being dispensed from or placed into the tank.

Finally, the method of simply using a tank strap chart and a level meter for determining the quantity of liquid product within a tank involves a number of inaccuracies associated not only with the level variations that are due to temperature, etc., but also with the assumption that the tank strap chart continues to be accurate over time. Even if a tank strap chart is accurate at the time it was created, most likely by the manufacturer immediately after sale, chances are that the tank itself has become deformed or dented or misconfigured in some way. Any alteration of the three dimensional configuration of the tank can significantly affect the accuracy of the tank strap chart. Failure to keep these inaccuracies in mind could reduce the final accuracy of any measurements associated with inventory control of the tank product. Even more importantly when the user becomes concerned with more difficult to measure changes in the product level such as those caused by leakage, these inaccuracies could make the possibility of detecting a leak altogether impossible.

Efforts to supplement the above methods of inventory and quantity control for a liquid product within a tank by more accurately measuring the flow of the product in and out of the product of the tank have helped, but have by no means solved the problems. In the typical application of a petroleum product liquid storage tank, namely the neighborhood gas station, gasoline products may be continuously being dispensed from a tank during 24 hour day. Intermittently, the tank is refilled by the placement of a large quantity of fuel from a delivery tank. Theoretically, accurate measurements of flow into and out of a tank could allow the station manager or owner to determine whether any fuel was leaking from the tank in an uncontrolled manner. Obviously if it took more to refill the tank from a delivery tank than was dispensed from the tank and measured by way of flow meters in the station's gasoline pumps, then there would be some indication that leakage from the tank was occurring. Even here, however, there is some need to accurately determine a specific level within the tank so as to define when the tank is full upon delivery and then filled to that level again upon delivery.

Temperature variations and differences in the characteristics of liquids dispensed also affect this method of measuring and inventory control. Even more importantly, however, are inaccuracies that exist in the various flow meters used for both dispensing liquid product from the tank and placing the liquid product within the tank upon delivery. Although these meters are calibrated, in many cases as required by law, these calibrations do change not only with respect to individual meters and over time, but with respect to temperature, pressure, and the characteristics of the liquids being pumped.

Even the combination, therefore, of a tank level measuring means and a flow meter arrangement has a number of inherent inaccuracies that result from factors that are not typically addressed in an analysis and determination of inventory quantity. Such systems are capable of measuring rather significant anomalies in inventory that might result from large leaks, but are not capable of accurately determining inventory so that small leaks can be detected and more accurate control of the product can be achieved.

There is a significant need, therefore, especially in the area of petroleum product storage, for a method and system for accurately detecting and quantifying leakage from underground and above ground storage tanks. It is important to take into consideration all factors that are known to affect the ability of existing technology to make accurate level and flow measurements and to collect level and flow data and analyze it in conjunction with known liquid characteristics. This would accurately characterize the controlled inflow and outflow of product from the tank not only for the purpose of controlling costs and monitoring inventory, but perhaps more importantly for the purpose of detecting and immediately quantifying leakage of sometimes toxic liquids from storage tanks.

SUMMARY OF THE INVENTION

The process defined by the present invention provides both an inventory maintenance system under ordinary circumstances and a leak detection and quantification system under abnormal circumstances. The system of the present invention accomplishes this by collecting information from three specific sources. First, the method utilizes information provided upon delivery of a particular liquid product that is to be stored within the storage tank. Second, the system utilizes information provided by thermal and liquid level sensors located within and about the storage tank. Finally, the system utilizes information provided by flow meters associated with the dispensing of product from the tank.

Initially, the method incorporates the collection of information from what is commonly referred to as the delivery ticket for petroleum products. When a liquid product is delivered to a storage tank, information on the quantity of the product and its physical characteristics is provided. The process of the present invention uses information from the delivery ticket to determine the molecular weight of the liquid product and its corresponding vapor pressure. The system then uses these values to create an accurate model of the amount of product that is in a vapor state in the storage tank ullage. It had previously been accepted that all gasses except benzene could be neglected in this vapor modeling, but the results of applicant's studies indicate that other gas constituents must be included and that as much as 20 gallons of a petroleum product may be in the vapor state in a typical underground storage tank only ⅓ full.

In order to account for liquid in the state of a tank during cycles of delivery into, and delivery out of the tank, the process of the present invention assumes that the initial values can be and are determined from measurements of liquid level and temperature. Certain properties of the petroleum products are known or can be estimated as, for example, liquid density and liquid vapor pressure. Changes in liquid density as a function of temperature are modeled according to accepted practices from the *Handbook of Natural Gas Engineering*. The change in vapor pressure as a function of temperature is also modeled through the same standards.

The change of the physical state of the liquid takes place at such a rate that equilibrium is established rapidly between the liquid and vapor states. Before this condition, the total pressure in the tank is the sum of the vapor pressure of the product and the pressure due to the fraction of air in the gas space in the tank, since the pressure in the tank is typically kept constant by a vent valve. The vapor pressure of the liquid varies with temperature and with different molecular compositions so that the actual quantity in moles of petroleum product or liquid in the gas space is a function of these values. The actual gas space within the tank is based upon the tank "strapping" that is determined from the three dimensional configuration of the tank and the level of the liquid within the tank. The mass of vapor can be determined by multiplying the number of moles of vapor product in the gas space by the product's molecular weight. Since the density of the liquid at a particular temperature is known, the resultant mass can be converted into an equivalent volume by which subsequent inventory measurements and quantifications can be made.

During the cycle in which the tank is being drained through liquid dispensing, the liquid vaporizes to fill a portion of the gas space within the tank such that at the end of the dispensing cycle, the liquid level is actually lower than expected as a result of the quantity of liquid dispensed. The process of the present invention takes this into account in both maintaining inventory control and detecting the presence of a leak.

The information from the delivery ticket is also used to provide a cross reference for stations to verify actual tank deliveries by reaffirming and recalibrating the volume information. This information assists in maintaining accurate inventory reconciliation.

The second source of information for the system of the present invention is a combination of thermal and liquid level data acquired from sensors located within the storage tank. U.S. Pat. No. 4,976,146, issued to Senghaas, et al., on Dec. 11, 1990, discloses a liquid level measuring apparatus accurate enough to be utilized in conjunction with the method and system of the present invention. The descriptions and disclosures contained in the Senghaas patent are incorporated herein by reference. The type of liquid level measuring apparatus shown in Senghaas provides a very accurate real time means, for determining the level of a liquid within a particular tank. This liquid level metering system is typically installable in either an existing or a newly manufactured tank. The device utilizes a float that surrounds a column of switches that are magnetically activated as the float crosses the level of the switch. While this approach to measuring the level within a tank is fairly well known, the Senghaas apparatus lends the accuracy to the method that the system of the present invention requires.

In addition, the system of the present invention measures and acquires information regarding the temperature of the product from a plurality of locations within the tank, typically along the column of the liquid level measuring apparatus. This combination of temperature measurements and liquid level measurements provide the method of the present invention with as much information as is necessary from the tank itself. Used in conjunction with the information provided on the delivery ticket with respect to liquid characteristics, all calculations with respect to liquid and vapor state, product mass and volume, and the resultant changes in liquid level, can be made.

Combine the accuracy of the measuring sensors with the ability to sample them on a continuous basis and the accuracy of the system becomes even better. To a great extent, any remaining inaccuracies can be eliminated by statistical means that allow the system overtime to average out irrelevant anomalies and inaccuracies and continuously recalibrate itself to better identify and control flows in and out of the system.

Finally, the third source of information for the system of the present invention is provided by flow meters associated with dispensing of the product from the tank. In the most typical application of the present invention, namely that of a retail gasoline station, flow meters are already in place in the individual gasoline pumps that dispense the products to the customers. As indicated earlier, these flow meters are calibrated as required by law, but are typically not incorporated into an inventory control system beyond what is necessary for the regulation of the sale of the product. Seldom are these flow meters a factor in determining whether leaks exist within the storage tanks themselves.

Unless some combined analyses of the liquid level within the tank, the delivery ticket information, the tank characteristics, etc., and the flow meter information can be provided, then little at all can be said about the existence of a leak or the accurate control of inventory. The use of the flow meters is an essential component in the method of the present invention, but the flow meters would not themselves be tremendously useful unless the present invention provided the means that it does for continuous recalibration. Because of its ability to compare changes in liquid levels within the tank with flow in and out of the tank, the system can constantly recalibrate and make more accurate the values associated with the plurality of flow meters typically found at a gas station. In other words, because the system of the present invention can constantly compare an amount of gasoline dispensed through a particular flow meter with the resultant change in tank level accurately determined with respect to liquid characteristics and liquid temperatures, the system of the present invention can arrive at ever more accurate characteristics for each of the sensors that it utilizes.

It is important to emphasize that the leak detection elements of the present invention include the tank and the lines connecting the tank to the meters.

The improvements of the present invention, therefore, lie not only in the combination of all of the information described above in accurate form, but the ability of the system to continuously sample this information, compare it with information provided by and calculated from other sources, and recalibrate the data by which it maintains inventory control. All of this taken in combination in the system allows the user to not only maintain extremely accurate inventory control, to verify delivered quantities and dispensed quantities, but to also adhere to government regulations regarding leak detection in the 0.2 gallon per hour to less than 0.1 gallon per hour range from underground and above ground storage tanks and their lines to the meters. All of this is achieved in a substantially automatic system that requires little if any user interaction on a daily basis. To achieve the same results with the same accuracy would require extensive individual involvement in both the measuring of flows out of the tank and in the accurate determination of tank levels by other manual means. Even with labor intensive manual measurements, the higher accuracy needed to detect leaks of less than 0.2 gallons per hour, could not be obtained in real time without the present invention's ability to recalibrate flow meters, "restrap" the tank, and collect data on a continuous basis.

It is, therefore, an object of the present invention to provide a method for detecting and quantifying leakage from liquid storage tanks.

It is a further object of the present invention to provide a method for accurately controlling the inventory within liquid storage tanks.

It is another object of the present invention to provide an inventory control and leak detection system for liquid storage tanks that is capable of utilizing information with respect to the liquid characteristics to improve the accuracy of volume and mass measurements made with respect to the liquid.

It is another object of the present invention to provide an inventory control and leak detection system for liquid storage tanks that combines information and data from the liquid characteristics, the tank characteristics, and the measurement of flow in and out of the tank in a manner that allows redundant measurements of quantities input and output from the tank so as to continuously recalibrate the sources of data.

It is another object of the present invention to provide a method for detecting leaks and inventory control in liquid storage tanks that collects information on product quantities and characteristics within the tank and product quantities dispensed into and from the tank through the lines on a real time basis that allows data sampling sufficient to use statistical methods to eliminate inaccuracies and anomalies in the data.

It is another object of the present invention to provide a leak detection and inventory control system for liquid storage tanks and the lines that provides the automated data processing capabilities necessary to carry out statistical methods designed to eliminate inaccuracies and anomalies in the collective data.

Finally, it is another object of the present invention to provide both an inventory maintenance system and a leak detection and quantification system for liquid storage tanks and lines to the meter that collects information on the characteristics of the liquid product being stored within the tank, thermal and liquid level information from within the tank, and flow information associated with dispensing of the liquid from the tank. These and other objects of the present invention will become apparent from the following description of a preferred embodiment of the invention and the appended claims.

DETAILED DESCRIPTION OF THE PREFERRED EMBODIMENT

Figure 1:
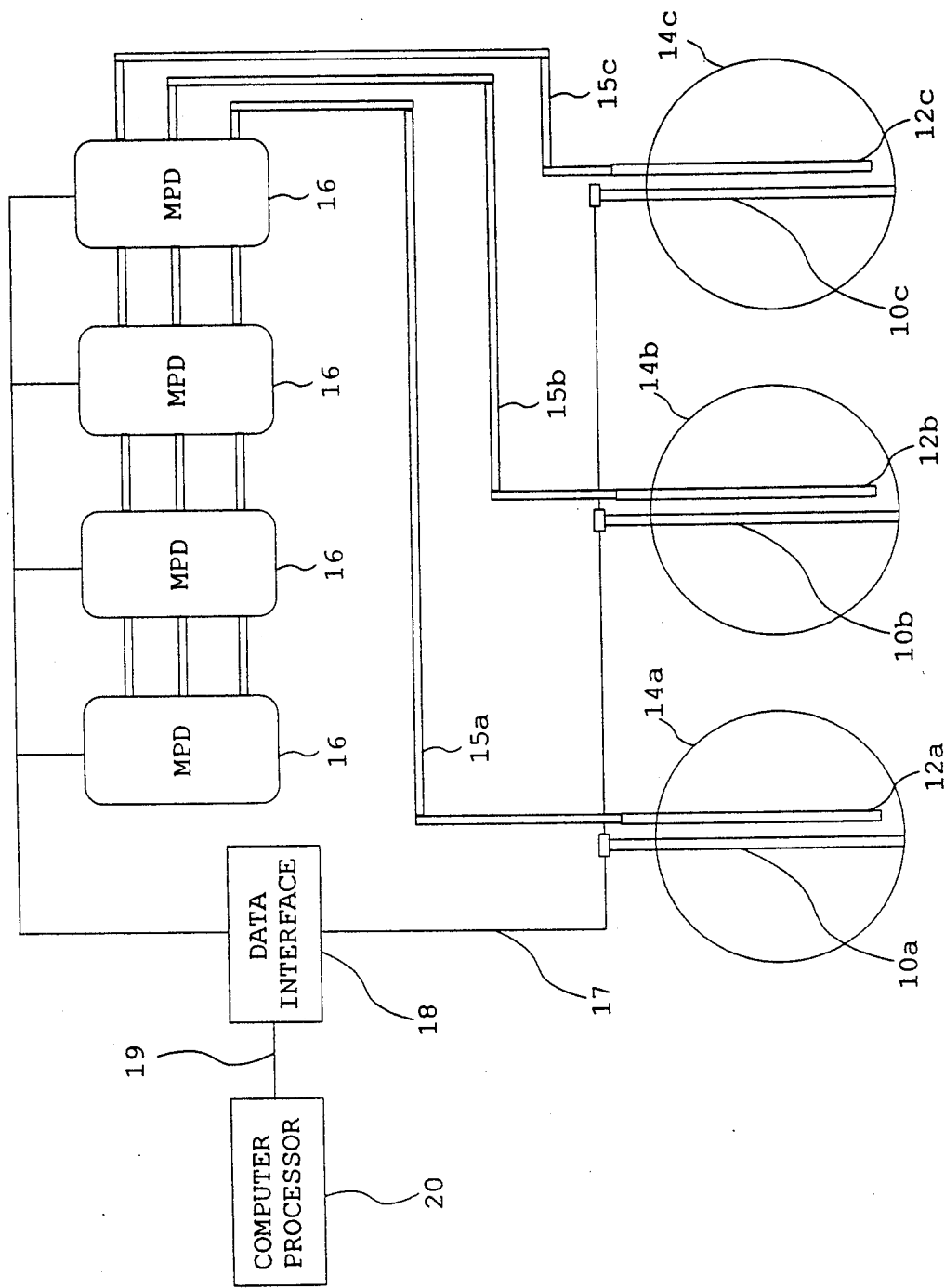
FIG. 1 is a schematic representation of the entire system of the present invention, including the tanks and lines, generally showing the physical components necessary for carrying out the method of the present invention.

Reference is first made to FIG. 1 for a general description of the physical components of the system necessary for implementation of the method of the present invention. FIG. 1 represents the system structure as might typically be incorporated into a gasoline station with multiple product dispensing islands.

FIG. 1 discloses first of all a plurality of underground storage tanks (14a-c). These tanks are shown roughly in cross section for the purpose of disclosing the position of draw tubes and sensors within the tank. Also shown in FIG. 1 is a plurality of "multiple product dispensing units" or MPD (16a-d). Between storage tanks (14a-c) and multiple product dispensing units (16a-c) are a plurality of product flow lines (15a-c) connected to MPD (16a-d) in parallel. These components are already typical of a gasoline station with a multiple number of product tanks and a multiple number of product dispensing units. The system of the present invention utilizes the existing product dispensing system of a typical gasoline station and incorporates sensors and data processing units necessary for the implementation of the present method.

Underground storage tanks (14a-c) are typically provided for the plurality of different gasoline grades available at gas stations. Tank (14a) for example could be unleaded, tank (14b) unleaded plus, (14c) unleaded supreme, all varying according to octane levels, etc. Multiple product dispensing islands (16a-d) could be of any number and are limited only by the size of the station and the number of locations that customers are provided to dispense gasoline into their cars. The three grades of gasoline, of course, are available at each of the MPD (16a-d) and are typically connected in parallel as shown in FIG. 1. Flow meters already exist with respect to each of the products at each of the MPD (16a-d). The system of the present invention, therefore, incorporates and uses these flow meters albeit through a method that continuously recalibrates their accuracy.

Implementation of the method of the present invention requires the use of both temperature and level sensors that are typically incorporated into a sensor column that can be lowered adjacent to the existing drop tube for underground storage tanks. These sensor columns (10a-c) are disclosed in their positions in FIG. 1 adjacent to drop tubes (12a-c) which draw the liquid product from storage tanks (14a-c). Sensor columns (10a-c) are all connected by way of data line (17) to a data interface (18) which appropriately conditions and, in some cases, records the information provided from sensor columns (10a-c).

Data interface (18) also collects information from flow meters (not shown) in MPD (16a-d). Here also the flow information might be used real time or might be recorded within data interface (18).

Data interface (18) is connected through a communication link (19) to a computer processing system (20). The physical requirements of computer processor (20) are such as could be fulfilled by a typical personal computer system capable of inputting data of the type described below and making mathematical and statistical calculations with the data. Typically, this means processing power of the level normally found in a personal computer system along with an available array of memory that can be preprogrammed with certain information regarding the characteristics of the tanks and the products being dispensed and the capacity to make some statistical analysis of the information being collected.

As indicated above, the system of the present invention relies upon the accurate real time collection of information from essentially three different sources. The first of these sources is input directly into computer processor (20) either prior to the operation of the system, as with tank characteristics for a tank strap chart, or is input on an as needed basis through a computer keyboard (not shown) into computer processor (20), such as with delivery ticket information regarding the specific fuel characteristics.

The second source of information comes from the flow meters found in MPD (16a-d) and is retrieved into computer processor (20) by way of data interface (18). The final and third source of information necessary for implementation of the method of the present invention is acquired by way of sensor columns (10a-c) and is also entered into computer processor (20) by way of data interface (18).

Figure 2:
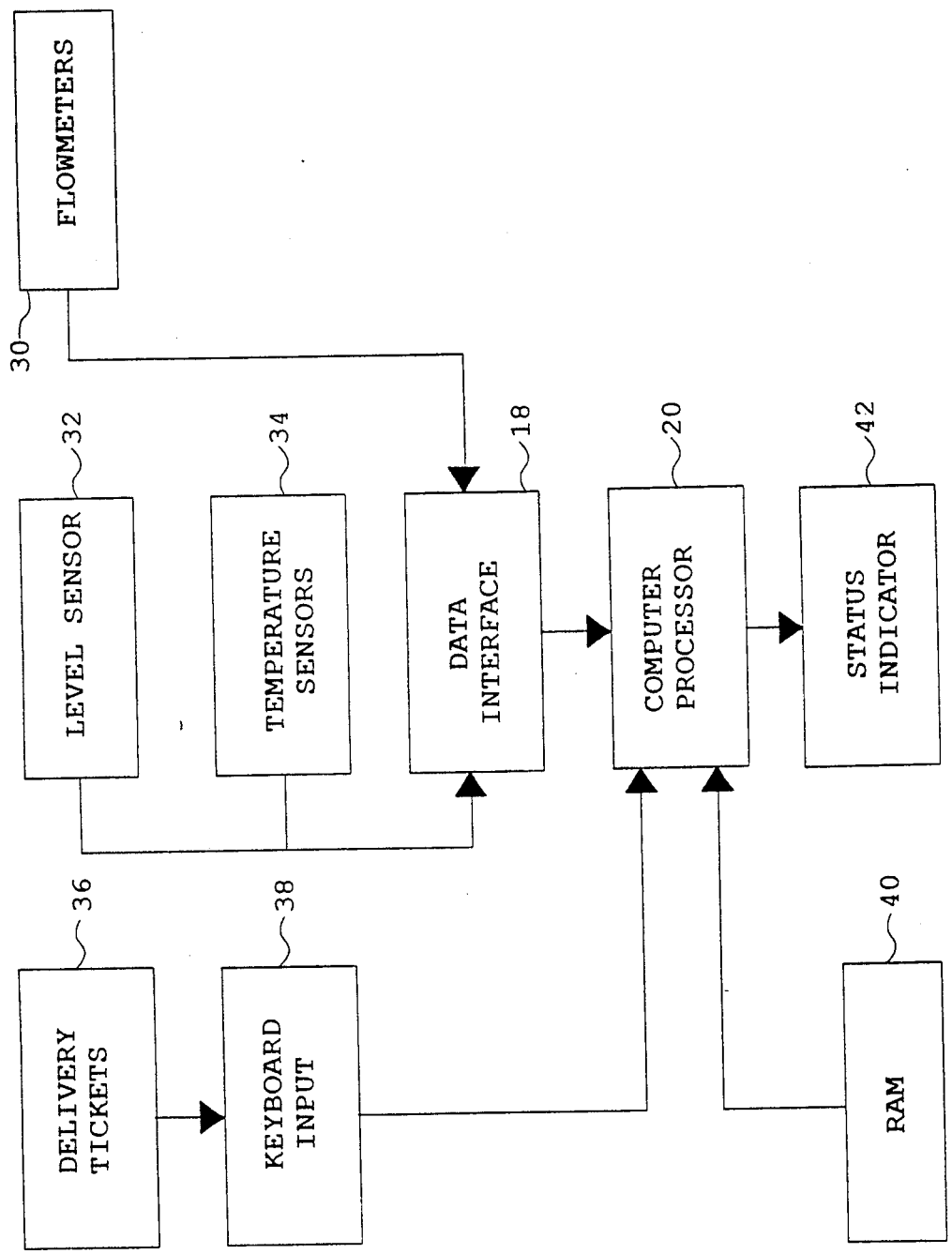
FIG. 2 is a block diagram showing the arrangement of the physical components as they are functionally connected to carry out the method of the present invention.

Reference is now made to FIG. 2 for a detailed description of a block diagram showing the functional relationship between the physical components of a system appropriate for implementing the method of the present invention. FIG. 2 is roughly organized in the three areas of data collection that are necessary for implementation of the present method. In the first column (left hand side of FIG. 2), delivery ticket information (36) is entered into computer processor (20) by way of keyboard input (38). Delivery ticket information is described in more detail below. In addition to this information that would vary on a product by product basis, tank characteristics such as the tank strapping chart are already stored in RAM (40) and provided to computer processor (20) Also stored in RAM (40) is information regarding typical characteristics of standard petroleum products. This information is essential for determining not only the effects of temperature upon the product, but the relative quantities of liquid and gas present in the tank as a result of temperature and liquid level changes.

The second basic source of information is provided directly from the storage tanks themselves and is shown in the second column in FIG. 2. These include level sensor information (32), and temperature sensor information (34) which, as mentioned above, are provided to computer processor (20) by way of data interface (18). When combined with the information provided from delivery ticket (36) and that information already stored in RAM (40), the necessary calculations described above and below can be carried out in computer processor (20).

Finally, information from flow meters (30) (third column in FIG. 2) is provided to computer processor (20) by way of data interface (18), and again in combination with the information provided by delivery ticket (36), level sensors (32), temperature sensors (34), and the information already stored in RAM (40), the complete implementation of the inventory reconciliation and leak detection objectives of the present invention can be accomplished.

Status indicator (42) is shown in FIG. 2 as the one other additional physical feature of the system that allows monitoring by the user. Status indicator (42) might be anything from as simple an arrangement as an alarm indicator to a more complicated computer display showing all of the various parameters measured and calculated by the system. The preferred embodiment system indicator provides a minimal amount of information with respect to product inventory control, i.e., quantity of product within the tank, quantity of product dispensed in a given period of time, quantity of product delivered to the tank, the existence of any anomalous leaks from the tank and the quantification of any such anomalous leaks. Such status indications could be provided by a simple video or digital display device specifically designed for the system or could, as mentioned above, simply be provided on a display screen for the computer processor. In the simplest of configurations, the status indicator could be an array of alarm lights indicating the existence of a leak or the existence of normal operating conditions.

Figure 3:
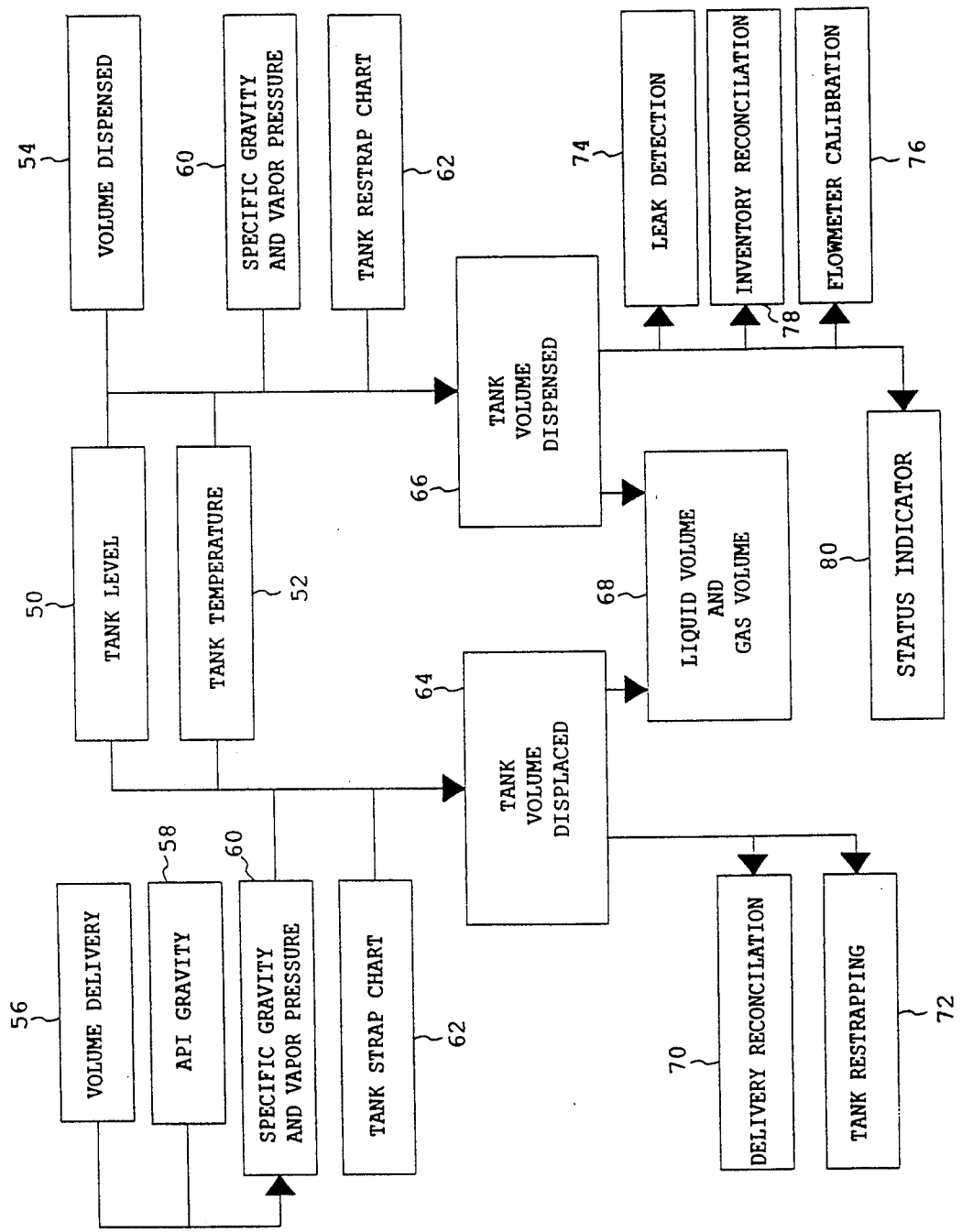
FIG. 3 is a block diagram showing the three areas of information/data collection and operation.

Reference is now made to FIG. 3 for a more detailed description of the collection of information from the devices within the system and the analysis and use of that information for delivery reconciliation, inventory reconciliation, and leak detection.

Again, FIG. 3 is roughly organized into three columns which distinguish information provided from the delivery ticket, information provided from the storage tanks themselves, and information provided from and utilized by the product dispensing components of the system.

Initially product is delivered to the storage tank by way of a delivery tank truck. Two essential bits of information are provided along with the delivery of the product and are shown in FIG. 3 as volume delivered (56) and an API gravity value (58). The combination of these two bits of information allows the system to determine the specific gravity and the vapor pressure (60) of the product. This information is essential as will be shown below, in determining the amount of product that is actually in the tank in a liquid state and the amount of product that is actually in the tank in a gaseous state. This information is also essential for analyzing the affects of temperature on the level measured within the tank and on the flow characteristics to be later measured. Once specific gravity and vapor pressure (60) are calculated, they are used not only for the system's analysis of product delivered, but also the system's analysis of product dispensed as described later.

As product is being delivered into the tank, information regarding tank level (50) and tank temperature (52) is also acquired into computer processor (not shown). An analysis, described in more detail below, compares the volume delivered (56) with a change in volume as measured by tank level (50) and qualified by tank temperature (52), specific gravity and vapor pressure (60) and information from tank strap chart (62). This combination allows the calculation of tank volume displaced (64) and a comparison of that value with volume delivered (56). This allows delivery reconciliation (70) and on an ongoing basis allows tank restrapping (72).

Tank restrapping (72) is essentially a recalibration of tank strap chart (62) on a long term basis as the system "discovers" inaccuracies in the existing tank strap chart resulting from repeated discrepancies between measured values and calculated values. It is this feature of restrapping the tank that allows the present invention to increase its accuracy beyond that normally associated with a simple level indicator and tank strap chart combination.

Tank volume displaced value (64) finally allows the system to calculate and display if necessary liquid volume and gas volume (68) within the tank.

The second half of the system, namely the analysis and control of the product being dispensed from the tank is shown on the right hand side of FIG. 3. The basic element of information, volume dispensed (54), is provided from flow meters as described above. Volume dispensed (54) is generically shown in FIG. 3, although in the preferred embodiment of the system, flow meter information from each of the individual flow meters associated with each product at each dispensing pump is acquired. As with product delivered into the tank, product delivered out of the tank, as measured by the flow meters, can be compared to changes in tank level (50) measurement after analysis and the incorporation of factors associated with tank temperature (52) and the liquid characteristics established by specific gravity and vapor pressure (60), and tank characteristics as established by tank strap chart (62). Here, as with product delivery, a comparison can be made between the values determined from the information provided by volume dispensed (54) (flow meters) and that determined from tank level (50) and the other sensors and information utilized by the computer processor. This process of comparing the flow meter values with the values determined from sensors within the tank allows for inventory reconciliation (78), flow meter recalibration (76), and leak detection (74). Because it is leak detection (74) and, to some extent inventory reconciliation (78) that are of utmost concern to the user of the system of the present invention, these results also drive status indicator (80) to provide the user with immediate information on the operation of the system. As with product delivery analysis, product dispensing analysis results in a final liquid volume and gas volume (68) value that relates to inventory control.

Figure 4:
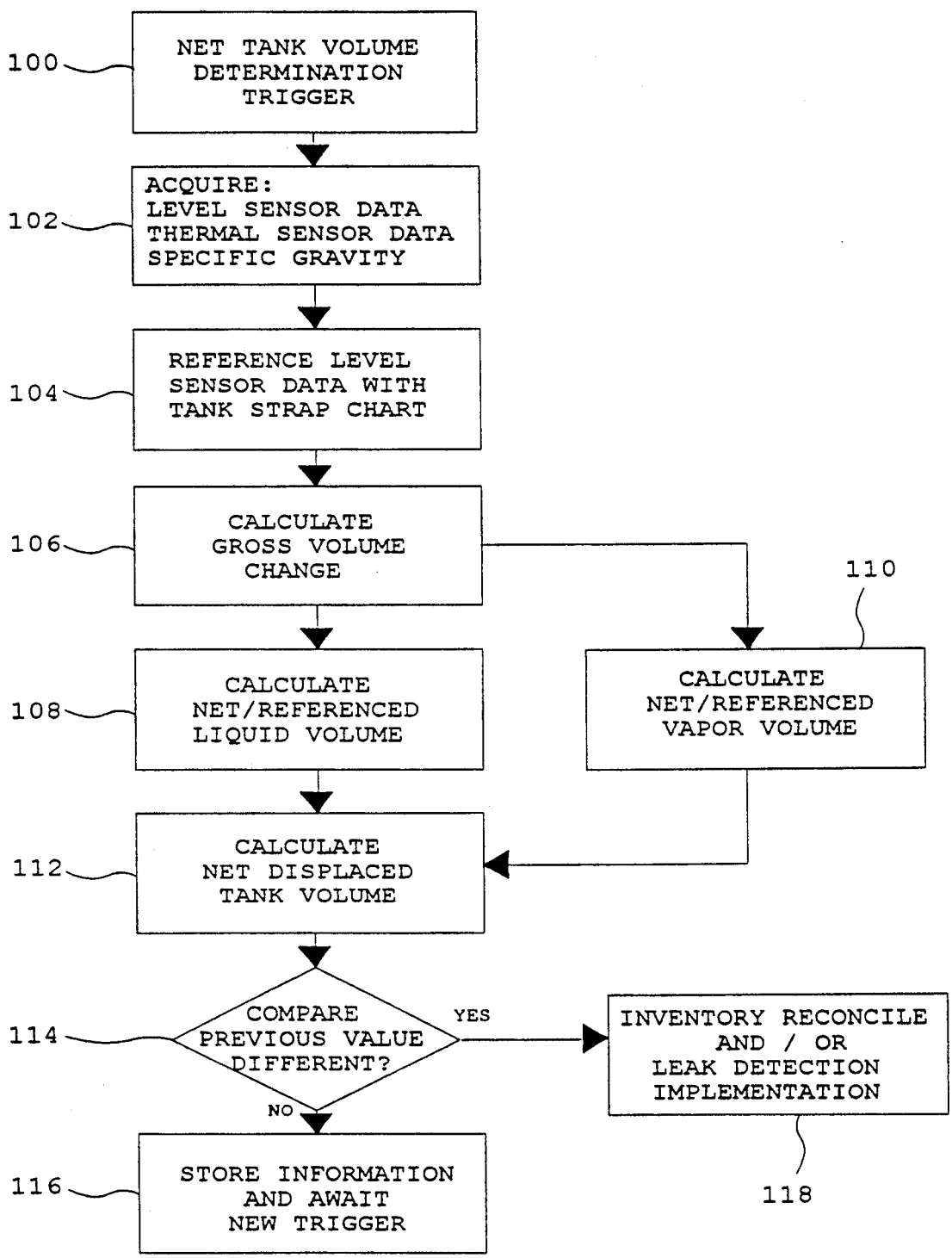
FIG. 4 is a flow chart showing in more detail the operation of the system in response to changes in the level of liquid product within the storage tank.

Reference is now made to FIG. 4 for a detailed description of the method of utilizing information from sensors associated with the underground or above ground storage tank itself. These sensors, as described above, collect tank level information and collect tank and product temperature information. The basic function of these sensors is to allow the system to eventually determine a displaced or dispensed product volume referenced to a standard temperature. It is this referenced volume value that is compared with a previous referenced volume value and used to determine delivery reconciliation, inventory reconciliation, and leak detection. It is also a value used to allow the system function of tank restrapping and flow meter calibration. This referenced displaced volume value will hereinafter be referred to as Net Tank Volume.

In general, the system makes calculations and arrives at a Net Tank Volume either on a periodic basis (for example every two hours) or on the basis of an event that is indicative of a change in the Net Tank Volume. This event is typically product being dispensed or product being delivered into the tank.

The first step in the process shown in FIG. 4, therefore, is the Net Tank Volume (NTV) determination trigger (100). This initiates the process of acquiring information necessary for the determination of a Net Tank Volume value. This includes information collection step (102) which retrieves a level sensor reading, a thermal sensor bank reading, and retrieves stored information with respect to the specific gravity of the liquid product previously acquired by way of delivery ticket.

The thermal sensor bank readings are actually a plurality of temperature readings in the preferred embodiment that are associated with different levels within the storage tank. One temperature reading is made very close to the point at which liquid product is dispensed from the tank so that in cases where the characteristics of dispensed product is important, such temperature values can be utilized. In other cases where the characteristics of vapor state versus liquid state are important, other temperature sensors within the column can be utilized.

Information collected at step (102) is then used in conjunction with information stored in strap chart (104) to calculate a volume value at the observed temperature (106). This volume value at an observed temperature (106) is hereinafter referred to as the Gross Volume Value.

In order to reference this gross volume value with previously measured and calculated values, it must be corrected for temperature, specific gravity, and vapor pressure. Step (108) determines a net displaced liquid volume value at a standard temperature according to the *Manual of Petroleum Measurement Standards* and the information provided from the temperature sensor bank readings, the specific gravity of the product, the vapor pressure of the product, and the gross liquid volume calculated in step (106) above.

The net vapor volume is then calculated in step (110), again by *Manual Petroleum Measurement Standards* used in conjunction with an ullage value (the difference between total tank volume and gross liquid volume), the temperature sensor bank readings, the specific gravity, and the vapor pressure. A net displaced volume is then determined in step (112) by summing the net displaced liquid volume and the net vapor volume from steps (108) and (110).

A comparison is then made in step (114) between a previous net displaced volume value and the current net displaced volume value. If no difference is determined, then the information is simply stored in step (116) and the cycle is again repeated upon the next NTV trigger (100). If a difference does exist, as determined in step (114), then a delivery check, step (118) is made and further processing to justify the difference is carried out as described below.

Figure 5:
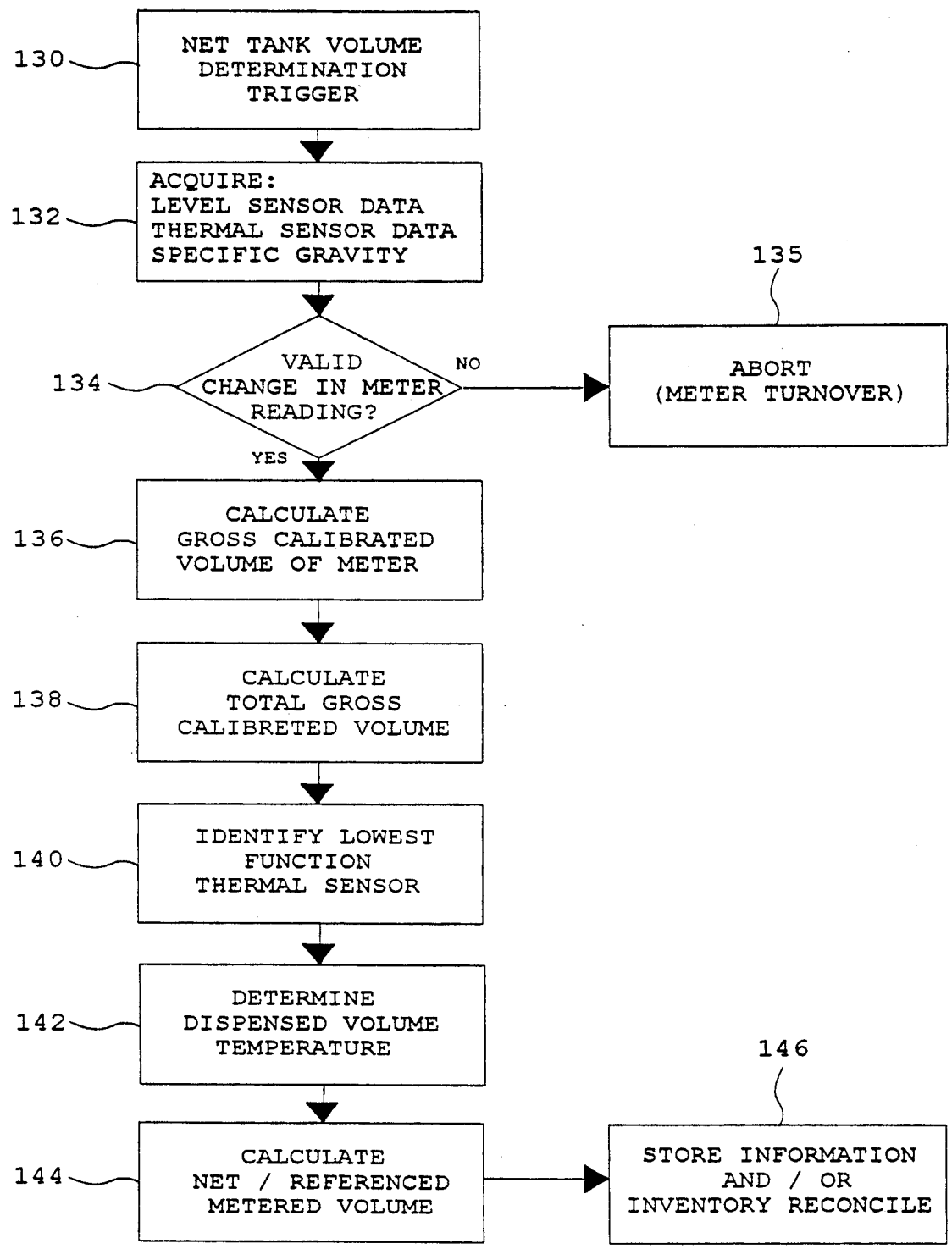
FIG. 5 is a flow chart showing in more detail the operation of the system in response to the dispensing of product from the tank through the flow meters incorporated in the system.

Reference is now made to FIG. 5 for a detailed description of the process of the present invention as it incorporates the use of flow meters in its analysis and in the leak detection and inventory reconciliation process. Here, the objective is to determine a Net Meter Volume after correcting for inaccuracies in the flow meters and variations according to temperature and specific gravity of the product. As with the system shown in FIG. 4, this operation is triggered either by an event which indicates the flow of product from the tank or on a periodic basis, for example, every two hours. This triggering event is shown in FIG. 5 as step (130). Information is retrieved in step (132) that is necessary for determination of the Net Meter Volume (NMV). This information collected in step (130) includes the gross meter readings from the flow meters, typically the pumps at the gasoline station, thermal sensor readings as described above in association with the tank level measurements, and again the specific gravity information of the liquid product as acquired from information on the delivery ticket.

An initial comparison step (134) is made to determine if, in fact, the deviation from the previous meter reading for a particular meter is positive and, therefore a legitimate value to consider, or negative and perhaps indicative of a turnover in the flow meter at the pump. If this difference is positive and a flow is appropriately indicated, step (136) retrieves a calibration coefficient for the particular flow meter under consideration. This calibration coefficient is a value either stored initially upon setup of the system or re-established after the continuous process of recalibrating a particular meter according to the performance of the system. This calibration step provides a gross calibrated volume of flow for the particular meter. Since a number of meters are typically involved in the dispensing of a product from a particular tank, i.e., see the plurality of meters present in FIG. 1 (16a-d), a sum of these gross calibrated volumes in step (138) provides a total meter volume for a particular tank. This value is still however referenced at an observed temperature and must be referenced to a standard temperature before appropriate comparisons can be made. The next step (140), therefore, begins the process of acquiring temperature information from the tank itself at a location close to that of the dispensed liquid. Step (140) determines if a bottom temperature sensor is available, i.e., functional, and information is collected therefrom. Step (142) outputs the temperature from the lowest functional sensor to be utilized in step (144) in conjunction with the meter volume value acquired from step (138) to determine a net metered volume value at a standard reference temperature. This process uses the metered volume value from step (138), the dispensed temperature value from step (142), and the specific gravity information all according to *Manual Petroleum Measurement Standards* to determine a net metered volume value. This information is then stored in step (146) for use with the leak detection inventory reconciliation and flow meter recalibration operations described in more detail below.

Figure 6:
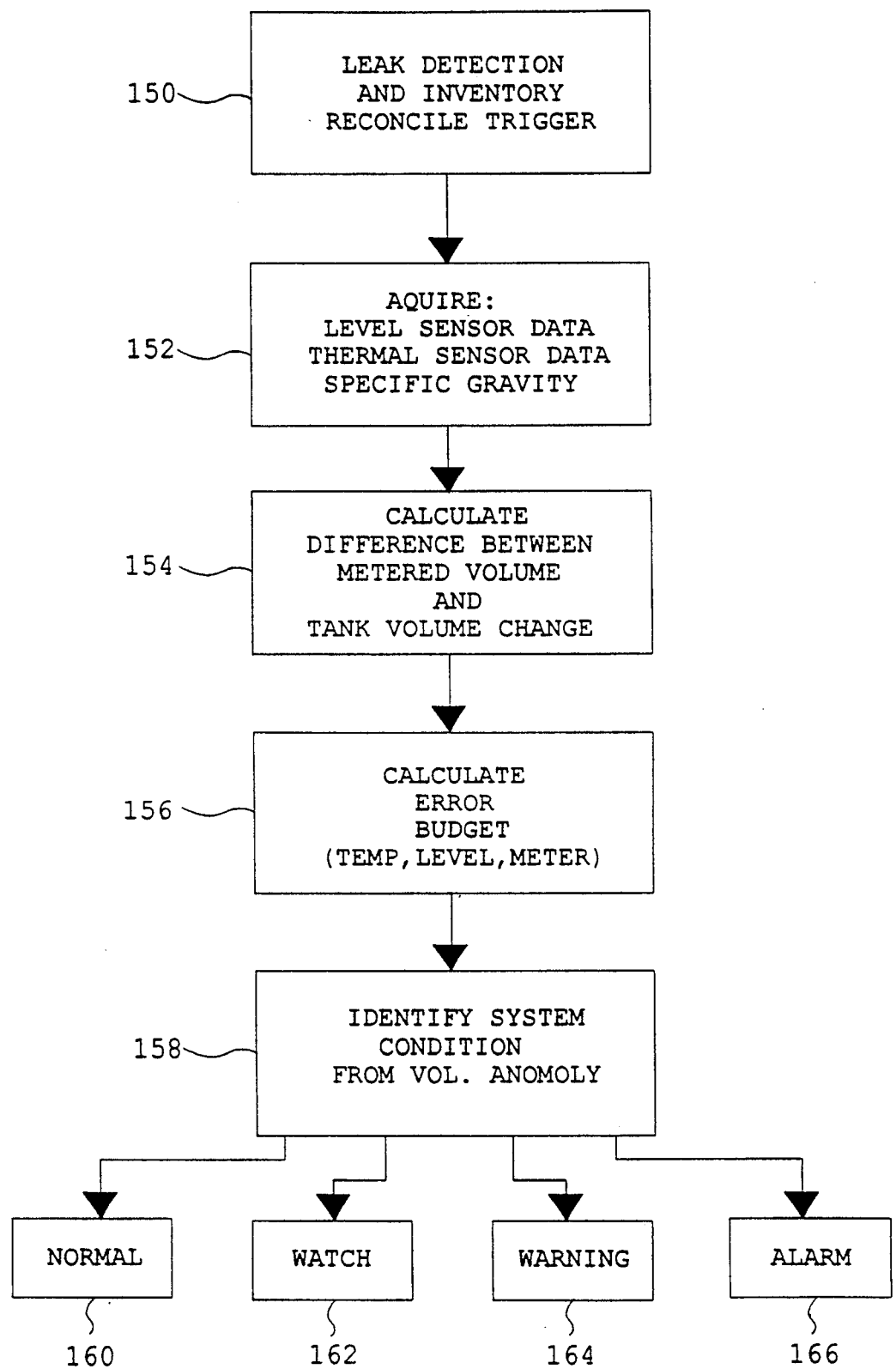
FIG. 6 is a block diagram showing in more detail the method for implementing leak detection and inventory reconciliation of the system of the present invention.

Reference is now made to FIG. 6 for a detailed description of the process of inventory reconciliation and leak detection. Again, the process described is triggered by a specific event or on a periodic occurrence, for example, every two hours. This triggering event is disclosed in FIG. 6 in step (150). The fundamental process of FIG. 6 occurs in step (152), wherein the net meter volume acquired by way of the steps described in FIG. 5 utilizing the flow meter measurements, is compared with the net tank volume determined by the steps described in FIG. 4 utilizing the tank level sensors. These two values, which have been referenced to a standard temperature, can then be compared and an error budget acquired to determine when the difference is indicative of a problem. Step (152), the comparison, relies upon the acquisition of information from step (154) which includes the level sensor readings for the tank, the thermal sensor bank readings, and the specific gravity information for the liquid.

This process is then followed by step (156) which determines an error budget for the difference and allows the system to identify when the difference is of a level sufficient to indicate an abnormal condition. The error budget is a combination of an error budget for the level measurements, the flow meter measurements, and the temperature measurements. If the difference calculated in step (152) is within certain bounds as determined in step (158), then a normal condition (160) is indicated. If the difference is outside this first range, then a status condition referred to as a "watch" condition (162) is indicated. If the difference is further outside of this range, then a third condition referred to as a "warning" condition (164) is indicated. Finally, if the difference is outside of the warning condition range, a fourth condition referred to as an "alarm" condition (166) is indicated.

As described previously, this comparison could result in the triggering of an indicator, or could be more thoroughly described and displayed on a computer screen with actual quantitative values in addition to condition indicators.

Reference is again made to FIG. 3 for a brief description of the tank restrapping function (72) and the flow meter calibration function (76) of the present invention. Important to the accuracy of the primary objective described in FIG. 6 above, is a continuous restrapping function and a flow meter recalibration function in the system.

One of the initial sets of data provided to the system is a tank strap chart that characterizes the volume of liquid within the tank referenced to a specific level taken at the drop tube. As described earlier, this tank strap chart is subject to inaccuracies from any number of sources. The system of the present invention, therefore, is capable of re-evaluating the accuracy of this tank strap chart and altering it as it "discovers" the more accurate characteristics of the tank. These more accurate characteristics are determined by continuous comparison between values for volume determined from the tank strap chart and values determined from other sources. Statistical means of analyzing large collections of difference values allow for an averaging of volume differences over a specific range of levels within the tank. This tank restrapping procedure incorporates information not only from product dispensed into the tank and the changes therewith, but also with products dispensed from the tank and the resultant changes.

If, for example, over a period of time the system identifies significant differences between tank strap chart values and measured values for a particular range of levels within the tank, perhaps due to a dent at that particular level in the tank, it can re-establish the true tank strap chart to incorporate these differences and essentially recalibrate these values. Standard statistical methods are available for making these difference calculations and averaging them in a manner that allows the system to determine the necessity of altering the stored standard characteristics of the tank.

Likewise, the system is capable of re-evaluating the calibration of the various flow meters associated with measuring the flow of product out of the tank. By a least squares analysis method and statistical regression methods well known in the art for making such calibrations, the individual meter readings are compared with the displaced volume values measured and calculated from other sources to re-evaluate and continuously recalibrate the individual flow meters.

The core of this restrapping and meter calibration function is the accuracy of the tank level sensors and the incorporation of temperature values into the calculations. Without the accurate level measurements and the incorporation of temperature values into an analysis of the volume of the liquid and the volume of the gas within the tank, such recalibration and restrapping procedures would themselves be too inaccurate. The reliability of such sensors as are described above and the refusal to assume that certain gas and liquid state characteristics could be ignored, all allow the system of the present invention to continuously refine its accuracy as the parameters of the system change.

The hierarchy for the leak detection phase described above is based upon the specifications required by the U.S. Environmental Protection Agency and relates the cumulative volume difference to the period of time over which that difference has occurred and signals a leak detection condition, as necessary. The "watch" condition described above, is indicative of a cumulative volume difference outside of that anticipated within 95% of non-leaking tanks. The "warning" condition indicates such cumulative volume value outside of the range on consecutive days. If the cumulative volume differences on consecutive days satisfy this warning condition, and on at least one of these days the cumulative volume exceeds a volume anticipated in 97.5% of non-leaking tanks, then an "alarm" condition is indicated. These 95% and 97.5% values are obtained from standard normal distribution charts and relate to the errors typically associated with and permissible with such storage tanks.

In summary, the present invention provides a method for inventory control and leak detection in liquid storage tanks that improves upon those methods and systems already in use by way of combining the acquisition of information from three sources, namely the delivered liquid characteristics, the tank liquid characteristics, and the dispensed liquid characteristics, to more accurately determine and compare volumes into and out of the storage tank. This ability to accurately measure and compare these volume values from a number of different sources and to consistently recalibrate and restandardize the basis for making these volume calculations, allows the method of the present invention to far exceed the accuracies of existing methods for controlling inventory and determining the presence of a leak.

Although this method has been described in association with specific elements referred to as a preferred embodiment, it is envisioned that the practitioner in the field is capable of extending the underlying concept of the present invention beyond the specifics of the embodiment described. It is anticipated that the claims appended hereto will envision and encompass a number of other embodiments associated with the underlying concept. Although the accuracy of the described tank level sensor is important to the operation of the present invention, other level sensors not described could be utilized in a manner that still yields effective use of the method of the present invention. It is likewise anticipated that additional sensors that alert the system to other conditions indicative of problems with the product dispensing system could be incorporated.

We claim:

1. A method for accurately detecting and quantifying changes in a quantity of liquid and gaseous product present in a storage tank over a period of time comprising the steps of:

dispensing a portion of said product from said tank through a dispensing means;

measuring a temperature corrected volume of said product dispensed from said tank through said dispensing means by means of flow meters operatively connected to said dispensing means;

sensing and measuring a positive or negative change in a temperature corrected volume of said product remaining within said tank by means of a sensor within said tank;

comparing said temperature corrected volume of said portion of said product dispensed as measured by said flow meters with said positive or negative change in said temperature corrected volume of product remaining within said tank as measured by said sensor; and identifying a source of difference between said temperature corrected volume of said portion of said product dispensed and said positive or negative change in said temperature corrected volume of product remaining within said tank.

2. The method of claim 1 further comprising the steps of:

measuring a temperature of said product remaining within said tank;

determining a vapor pressure value of said product remaining within said tank from a specific gravity value of said product and said temperature value; and qualifying said positive or negative change in said temperature corrected volume of said product remaining within said tank by said determination of said specific gravity and said vapor pressure and said measurement of said temperature.

3. The method of claim 2 further comprising the steps of:

determining an amount of said product remaining within said tank in a liquid state and an amount of said product remaining within said tank in a gaseous state; and qualifying said positive or negative change in said temperature corrected volume of said product remaining within said tank by said determination of said liquid state and said gaseous state amounts.

4. The method of claim 1 wherein said step of sensing and measuring a positive or negative change in said temperature corrected volume of said product remaining within said tank further comprises the steps of:

measuring a change in a liquid level of said product remaining within said tank; and comparing said change in said liquid level within said tank to nominal tank configuration data referenced to said liquid level.

5. The method of claim 1 wherein said step of measuring a positive or negative change in a temperature corrected volume of said product remaining within said tank, comprises the steps of:

sensing and measuring a change in a level of said product remaining within said tank with said sensor;

sensing and measuring a temperature of said product remaining within said tank; and comparing said change in said liquid level within said tank to nominal tank configuration data referenced to said level; and wherein said step of identifying a source of difference between said temperature corrected volume of said portion of said product dispensed and positive or negative change in said temperature corrected volume of product remaining within said tank, comprises the steps of:

tracking said difference between said temperature corrected volume of said portion of said product dispensed and said positive or negative change in said temperature corrected volume of product remaining within said tank over said period of time;

identifying a consistent difference between said temperature corrected volume of said portion of said product dispensed and said positive or negative change in said temperature corrected volume of product remaining within said tank for specific levels within said tank; and adjusting said nominal tank configuration data for said consistent difference at said specific levels.

6. The method of claim 1 wherein said step of sensing and measuring a positive or negative change in a temperature corrected volume of said product remaining within said tank, further comprises the steps of:

sensing and measuring a change in a level of liquid product remaining within said tank with said sensor;

sensing and measuring a temperature of said product remaining within said tank within said sensor;

comparing said change in said level within said tank to nominal tank configuration data referenced to said level; and wherein said step of identifying a source of difference between said temperature corrected volume of said portion of said product dispensed and said positive or negative change in said temperature corrected volume of product remaining within said tank, further comprises the steps of:

tracking said difference between said temperature corrected volume of said portion of said product dispensed and said positive or negative change in said temperature corrected volume of product remaining within said tank over said period of time;

identifying a consistent difference between said temperature corrected volume of said portion of said product dispensed and said positive or negative change in said temperature corrected volume of product remaining within said tank for a specific one of said flow meters; and calibrating said specific one of said flow meters to compensate for said consistent difference identified.

7. The method of claim 1 wherein said step of identifying a source of difference between said temperature corrected volume of said portion of said product dispensed and said negative change in said temperature corrected volume of product remaining within said tank further comprises the steps of identifying the presence of a leak of said product out from said tank or from said product dispensing means.

8. The method of claim 7 wherein said step of identifying the presence of a leak further comprises the steps of:

tracking said difference between said volume of said portion of said product dispensed and said negative change in said volume of product remaining within said tank over a 24 hour period of time;

identifying a consistent difference between said volume of said portion of said product dispensed and said negative change in said volume of product remaining within said tank not related to a specific one of said flow meters; and signalling the presence of a leak as evident from a consistent difference between said volumes not attributable to inaccuracies in any of said flowmeters.

9. The method of claim 1 wherein said step of identifying a source of difference between said temperature corrected volume of product dispensed and said positive change in said temperature corrected volume of product within said tank comprises identifying the presence of a leak of a foreign substance into said tank.

10. A method for accurately detecting and quantifying a temperature corrected volume of liquid product delivered into a storage tank over a period of time comprising the steps of:
   delivering a first portion of liquid product into said storage tank;
   sensing and measuring a positive change in a temperature corrected volume of a second portion of liquid product within said tank during said delivery step;
   dispensing a third portion of liquid product from said tank through a dispensing means;
   sensing and measuring a temperature corrected volume of said third portion of liquid product dispensed from said tank through dispensing means by means of flow meters operatively corrected to said dispensing means during a positive liquid level rise in said tank; and
   identifying a difference between said measured positive change in said temperature corrected volume of said second portion of liquid product within said tank and said measured temperature corrected volume of said third portion of liquid product dispensed from said tank through said dispensing means by means of said flow meters operatively to said dispensing means during said positive rise in said tank.

11. The method of claim 10 further comprising the steps of:
   tracking said difference over a period of time;
   identifying a consistent difference between said temperature corrected volume of liquid product delivered and said positive change in said volume of said second portion of liquid product within said tank for specific liquid levels within said tank; and
   adjusting nominal tank configuration data associated with said tank for said consistent difference at said specific levels.

12. The method of claim 10 further comprising the steps of:
   tracking said difference between said temperature corrected volume of said third portion of said liquid product dispensed and said positive change in said temperature corrected volume of said second portion of said liquid product within said tank over a period of time;
   identifying a consistent difference between said temperature corrected volume of said third portion of said liquid product dispensed and said positive change in said temperature corrected volume of said second portion of said liquid product within said tank for a specific one of said flow meters; and
   calibrating said specific one of said flow meters to compensate for said consistent difference identified.

13. The method of claim 10 wherein said step of identifying a difference further comprises the steps of identifying the presence of a leak of said product from said tank or from said product dispensing means.

14. The method of claim 13 wherein said step of identifying the presence of a leak further comprises the steps of:
   tracking said difference over a 24 hour period of time;
   identifying a consistent difference between said temperature corrected volume of said third position of said liquid product dispensed and said positive change in said temperature corrected volume of said second portion of said liquid product within said tank not related to a specific one of said flow meters; and
   signalling said presence of said leak as evident from a consistent difference between said volumes not attributable to inaccuracies in any of said flowmeters.

* * * * *